(12) United States Patent
Adachi (10) Patent No.: US 7,243,836 B2
(45) Date of Patent: Jul. 17, 2007

(54) INFORMATION TRANSMITTING APPARATUS AND METHOD, INFORMATION RECEIVING APPARATUS AND METHOD, AND INFORMATION PROVIDING SYSTEM

(75) Inventor: Seiichi Adachi, Kanagawa (JP)

(73) Assignee: Sony Corporation, Tokyo (JP)

( * ) Notice: Subject to any disclaimer, the term of this patent is extended or adjusted under 35 U.S.C. 154(b) by 183 days.

(21) Appl. No.: 10/866,245

(22) Filed: Jun. 14, 2004

(65) Prior Publication Data
US 2005/0011942 A1    Jan. 20, 2005

(30) Foreign Application Priority Data
Jul. 14, 2003    (JP) ............................. 2003-274300

(51) Int. Cl.
*G06F 17/00* (2006.01)
(52) U.S. Cl. ..................................... 235/375
(58) Field of Classification Search ................ 235/375; 726/27; 705/1
See application file for complete search history.

(56) References Cited
U.S. PATENT DOCUMENTS
2002/0114466 A1    8/2002    Tanaka et al.
2004/0003269 A1*    1/2004    Waxman et al. ............. 713/193

FOREIGN PATENT DOCUMENTS
CN    1371056 A    9/2002

* cited by examiner

*Primary Examiner*—Lisa Caputo
(74) *Attorney, Agent, or Firm*—Oblon, Spivak, McClelland, Maier & Neustadt, P.C.

(57) ABSTRACT

An information receiving apparatus purchasing content through a service transmits a license-issuing request including information about a client type representing the type of the information receiving apparatus to an information transmitting apparatus. In the information transmitting apparatus, a license-issuing request processing function part analyzes data on the license-issuing request, and a request-sorting function part selects, in accordance with information about the combination of a profile ID representing the type of the service and the client type, a license-issuing request conversion function part that performs processing corresponding to the combination. The selected license-issuing request conversion function part converts the data into data corresponding to performance of the information receiving apparatus in accordance with the terms of use for using the content and the profile ID. A license-issuing function part creates a license having a predetermined format using the data.

7 Claims, 4 Drawing Sheets

INFORMATION TRANSMITTING APPARATUS AND METHOD, INFORMATION RECEIVING APPARATUS AND METHOD, AND INFORMATION PROVIDING SYSTEM

BACKGROUND OF THE INVENTION

1. Field of the Invention

The present invention relates to information transmitting apparatuses and methods for transmitting licenses to use content to various information receiving apparatuses, information receiving apparatuses and methods for receiving the licenses and for using the content within the scope of the terms of use of the licenses, and information providing systems including such information transmitting apparatuses and information receiving apparatuses.

2. Description of the Related Art

Due to development and wide use of digital apparatuses, such as computers, digital content (hereinafter, referred to as content), such as music and images, has been available. Also, services, such as purchasing content via the Internet, are increasing.

For example, if a client that receives such services is a personal computer (hereinafter, referred to as a PC), a user first installs a player capable of playing content and then purchases the content from a Web site (or Web server) on the Internet. When the user transmits user information (or client information) to the server, a license for the PC is downloaded. Thus, the user can use the content within the scope of the terms of use of the license. The license is issued by the server by combining data in which the terms of use is written and information allowing identification of the client (for example, see Japanese Unexamined Patent Application Publication No. 2002-359616).

For a service, content has been played by a client dedicated to the service using dedicated software.

Recently, in addition to PCs, various types of network-compatible consumer electronics apparatuses (hereinafter, referred to as CE apparatuses) capable of connecting to the Internet have emerged. However, there has been no server that can create data on the terms of use corresponding to a plurality of types of clients having different performances. Thus, it has been necessary to provide a server corresponding to each type of client. Therefore, for example, if a new CE apparatus having a performance different from the existing apparatus is developed, a service cannot be provided to the new CE apparatus immediately.

SUMMARY OF THE INVENTION

The present invention is designed in view of such circumstances, and an object of the present invention is to provide an information transmitting apparatus and method for issuing a license corresponding to the type of an information receiving apparatus and for transmitting the license to the information receiving apparatus, an information receiving apparatus and method for using content within the scope of the terms of use of the transmitted license, and an information providing system including the information transmitting apparatus and the information receiving apparatus.

In order to achieve the above object, an information transmitting apparatus and method according to the present invention for receiving a license-issuing request signal for requesting for issuing of license data corresponding to content data from an information receiving apparatus connected via a network and for transmitting the license data corresponding to the license-issuing request signal to the information receiving apparatus are provided. The information transmitting apparatus and method read the terms of use from a storage section storing the terms of use for using the content data and issue the license data including the terms of use. In particular, for issuing the license data, the license data corresponding to performance of the information receiving apparatus is issued in accordance with receiving apparatus identification information included in the license-issuing request signal and representing the type of the information receiving apparatus.

Also, in order to achieve the above object, an information receiving apparatus and method according to the present invention are provided that transmit a license-issuing request signal for requesting for issuing of license data corresponding to content data to an information transmitting apparatus connected via a network, the license-issuing request signal including receiving apparatus identification information representing the type of the information receiving apparatus, and that receive the license data issued in accordance with performance of the information receiving apparatus on the basis of the receiving apparatus identification information from the information transmitting apparatus.

Also, in order to achieve the above object, an information providing system according to the present invention is provided that includes the information transmitting apparatus and the information receiving apparatus described above.

According to the information transmitting apparatus and method, the information receiving apparatus and method, and the information providing system described above, the information receiving apparatus transmits a license-issuing request signal for requesting for issuing of license data corresponding to content data to the information transmitting apparatus via a network, the license-issuing request signal including receiving apparatus identification information representing the type of the information receiving apparatus, and the information transmitting apparatus reads the terms of use for using the content data from a storage section and transmits the license data including the terms of use and corresponding to performance of the information receiving apparatus to the information transmitting apparatus in accordance with the license-issuing request signal. Thus, license data corresponding to the performance of each type of information receiving apparatus can be transmitted.

DESCRIPTION OF THE PREFERRED EMBODIMENTS

Embodiments of the present invention will be described with reference to the drawings.

Figure 1:
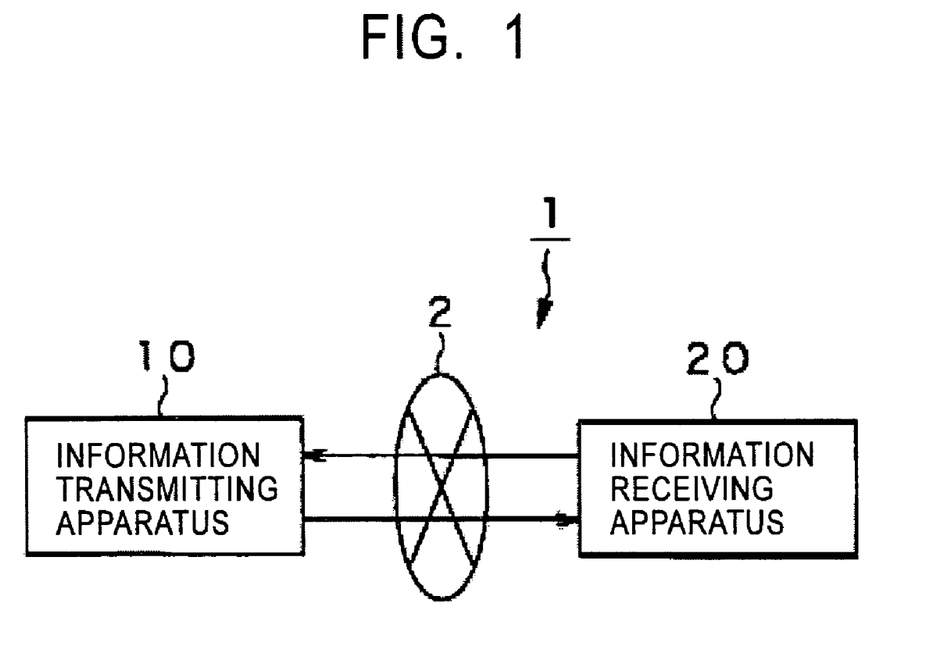
FIG. 1 shows the schematic structure of an information providing system according to an embodiment of the present invention.

FIG. 1 shows the schematic structure of an information providing system 1 according to an embodiment of the present invention. Referring to FIG. 1, the information providing system 1 includes an information transmitting apparatus 10 for transmitting content and a license to use the content and an information receiving apparatus 20 for receiving the content and the license and for using the content within the scope of the terms of use of the license. The information transmitting apparatus 10 and the information receiving apparatus 20 are connected to each other via a network 2, such as the Internet. Although only one information receiving apparatus is shown in FIG. 1, any number of information receiving apparatuses may be connected to the network 2.

Although the information transmitting apparatus 10 transmits content and a license to the information receiving apparatus 20 in this embodiment, content may be transmitted from other information transmitting apparatuses. In other words, the information transmitting apparatus 10 in this embodiment functions as at least a license server for transmitting a license.

Figure 2:
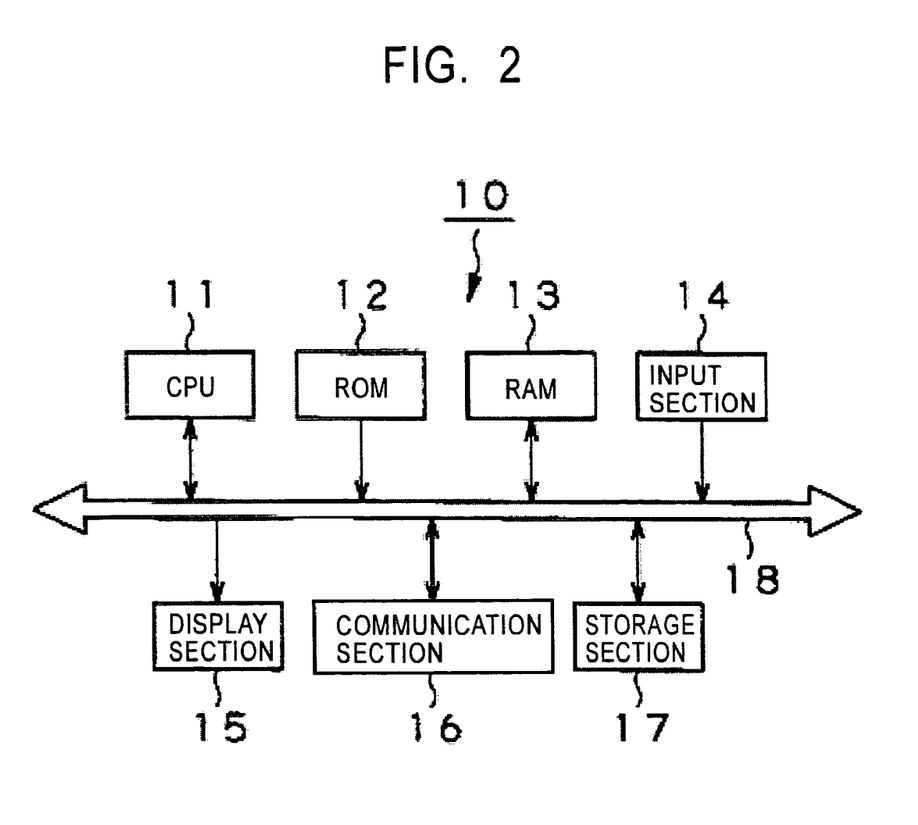
FIG. 2 shows the schematic structure of an information transmitting apparatus in the information providing system.

FIG. 2 shows the schematic structure of the information transmitting apparatus 10. Referring to FIG. 2, the information transmitting apparatus 10 includes a central processing unit (CPU) 11 for performing centralized control of each section of the information transmitting apparatus 10, a non-volatile read-only memory (ROM) 12, a volatile random-access memory (RAM) 13, an input section 14 for inputting various types of data by a user, a display section 15 for displaying various types of data, a communication section 16 for performing communication processing, and a storage section 17 for storing various types of data. These sections are connected to each other via a bus 18.

For example, the CPU 11 controls, in accordance with a program recorded on the ROM 12, the program to be executed. A program and data necessary for various types of processing performed by the CPU 11 are temporarily stored in the RAM 13 as necessary.

The input section 14 receives input to the information transmitting apparatus 10 by the user. The input section 14 includes, for example, a keyboard and a mouse.

The display section 15 includes, for example, a cathode ray tube (CRT) or a liquid crystal display (LCD). The display section 15 displays various types of data, such as text and images.

The communication section 16 includes, for example, a modem and a terminal adaptor. The communication section 16 is connected to the network 2 via a telephone line. The communication section 16 transmits data supplied from the CPU 11 to the information receiving apparatus 20. The communication section 16 also supplies data received from the information receiving apparatus 20 to the CPU 11, the RAM 13, and the storage section 17. The storage section 17 exchanges data with the CPU 11. Also, the storage section 17 stores and deletes data.

The information receiving apparatus 20 also includes a computer having a structure basically similar to that of the information transmitting apparatus 10 shown in FIG. 2, although this is not illustrated. The structure shown in FIG. 2 will also be referred to as the structure of the information receiving apparatus 20.

Figure 3:
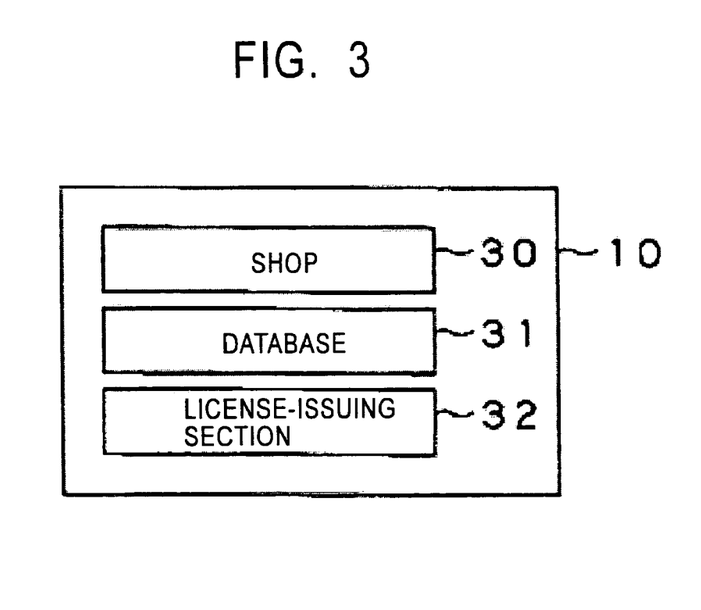
FIG. 3 shows the schematic structure of the information transmitting apparatus.

Referring to FIG. 3, the information transmitting apparatus 10 can also be understood as including a shop 30 functioning as an interface between the information transmitting apparatus 10 and the information receiving apparatus 20, a database 31 for holding content, a license, and information about the relationship between the content and the license, and a license-issuing section 32 for issuing a license corresponding to the type of the information receiving apparatus 20.

Figure 4:
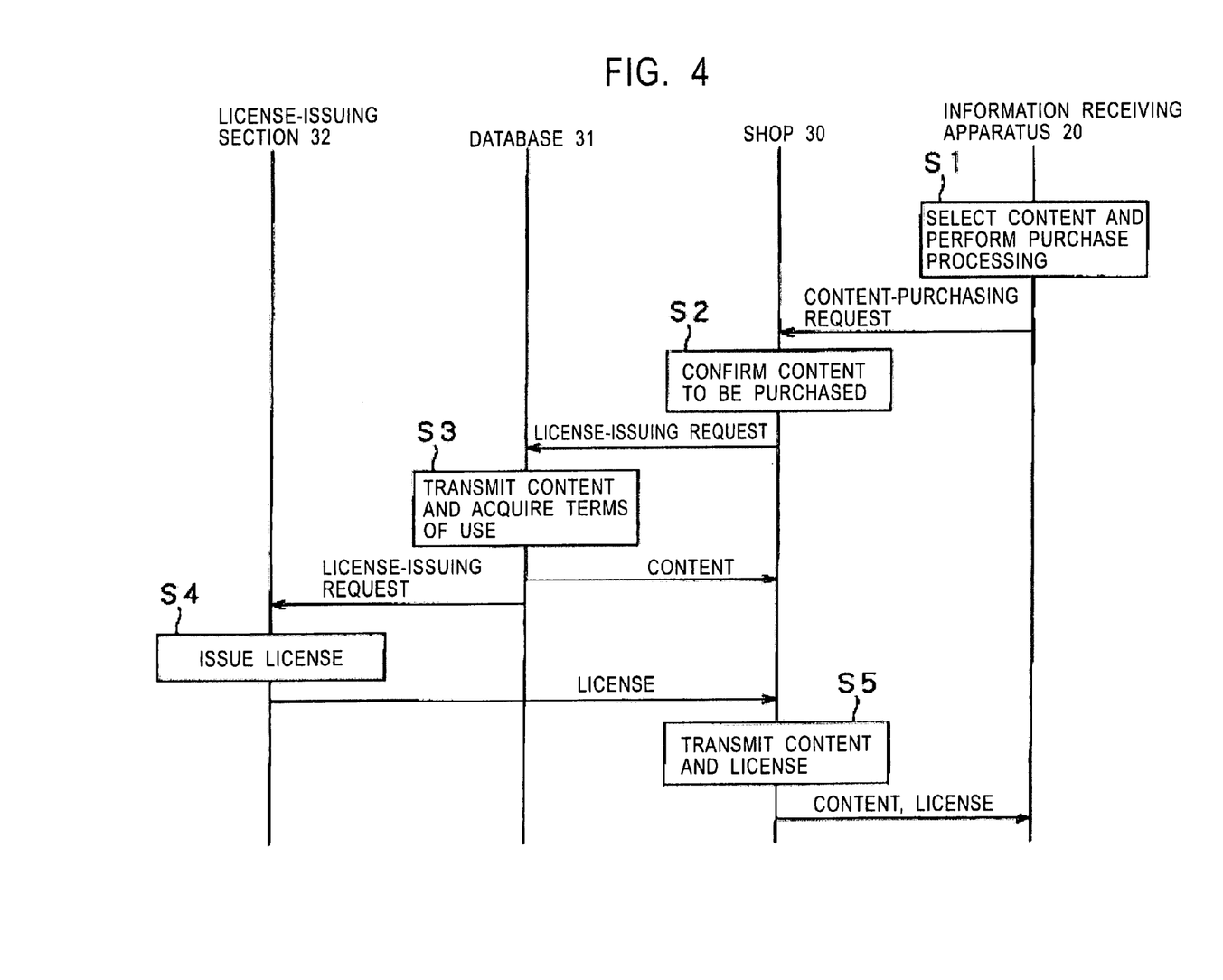
FIG. 4 is a flowchart for explaining a process performed by the information transmitting apparatus when a user of an information receiving apparatus purchases content.

A process performed by the information transmitting apparatus 10 when a user of the information receiving apparatus 20 purchases content will be described with reference to FIG. 3 and a flowchart shown in FIG. 4. In step S1, the information receiving apparatus 20 selects content to be purchased from the shop 30 that provides a service, such as a music distribution service, an electronic book selling service, or an image distribution service, and performs purchase processing so as to transmit a content-purchasing request to the shop 30. Here, the information receiving apparatus 20 transmits the content-purchasing request including a client type (clientType), which is identification information on the information receiving apparatus 20 (receiving apparatus identification information).

In step S2, the shop 30 supplies the clientType and an ID (contentID) of the content whose purchase is requested to the database 31 and transmits a license-issuing request.

In step S3, the database 31 searches for the content whose purchase is requested in accordance with the contentID, and supplies the content to the shop 30. Also, the database 31 searches for the terms of use corresponding to the contentID and a profile ID (profileID) allowing identification of the service. The database 31 supplies the terms of use, the profileID, and the clientType to the license-issuing section 32 and transmits the license-issuing request.

In step S4, the license-issuing section 32 issues a license in accordance with the clientType, the terms of use, and the profileID, and supplies the issued license (UsageRight) to the shop 30. The details of issuing of the license by the license-issuing section 32 will be described below.

In step S5, the shop 30 transmits the content and the license to the information receiving apparatus 20. Then, the content purchase processing terminates.

As described above, the information receiving apparatus 20 receives the content and the license from the information transmitting apparatus 10. Thus, the information receiving apparatus 20 can use the content within the scope of the terms of use of the license.

The information receiving apparatus 20, which uses content, is not necessarily limited to a personal computer (hereinafter, referred to as a PC). The information receiving apparatus 20 may be a consumer electronics apparatus (hereinafter, referred to as a CE apparatus). CE apparatuses have a lower performance compared with PCs, and, generally, CE apparatuses do not support the same functions as those of PCs. In such a situation, it is difficult to issue a license common to all the types of information receiving apparatuses. Thus, it is preferable that a license corresponding to the type or performance of the information receiving apparatus be issued.

Accordingly, the license-issuing section 32 according to this embodiment refers to the clientType, which is identification information transmitted from the information receiving apparatus 20, and issues a license having the details corresponding to the performance of the information receiving apparatus 20 represented by the clientType. For example, the license issuing section 32 issues a license having a length corresponding to the performance of the information receiving apparatus 20.

Figure 5:
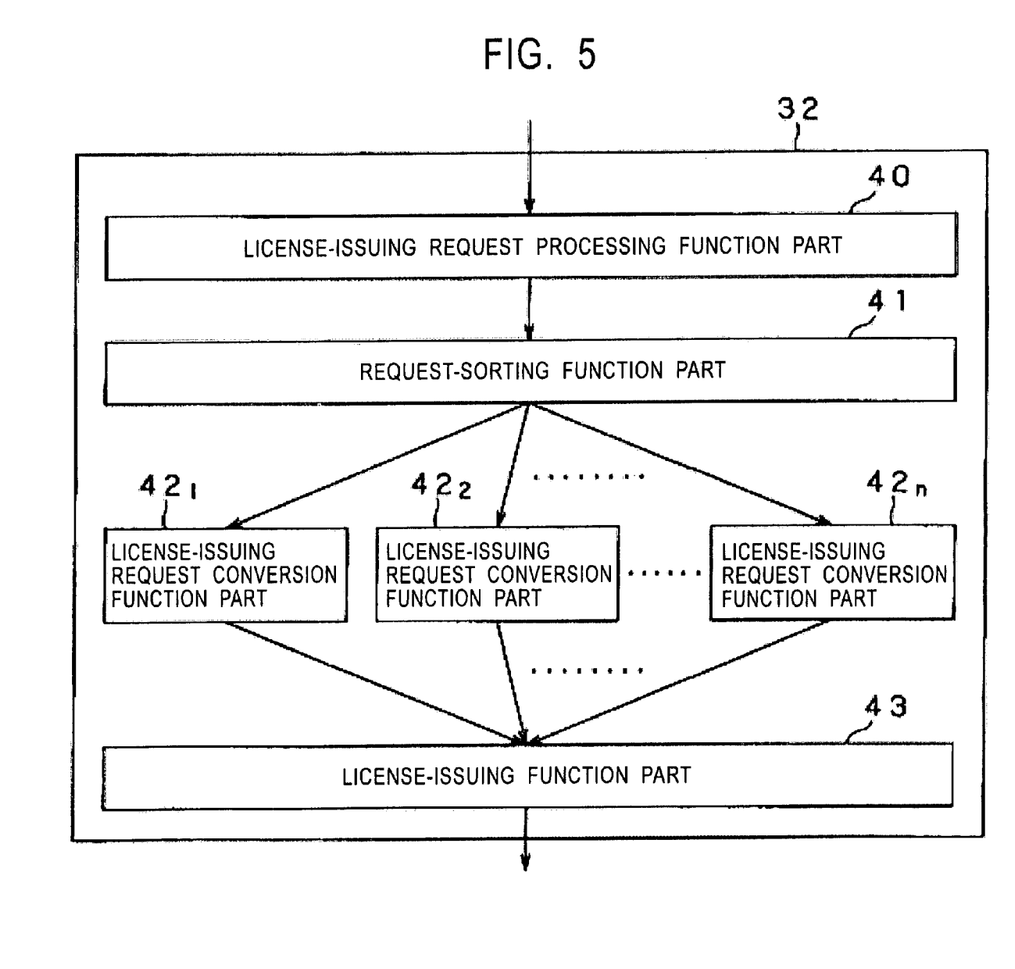
FIG. 5 is a functional block diagram showing a license-issuing part of the information transmitting apparatus.

The license-issuing section 32 will now be described. The license-issuing section 32 functions as a functional block, as shown in FIG. 5, under the control of the CPU 11 (see FIG. 2). Referring to FIG. 5, a license-issuing request processing function part 40 analyzes data on the license-issuing request supplied from the database 31 and reads information on the terms of use, the profileID, and the clientType. In accordance with information about the combination of the profileID and the clientType, a request-sorting function part 41 selects, from among license-issuing request conversion function parts $42_1$, $42_2$, . . . , and $42_n$ each performing predetermined processing, a license-issuing request conversion function part 42 that performs processing corresponding to the combination. The selected license-issuing request conversion function part 42 converts the data into data corresponding to the performance of the information receiving apparatus 20 in accordance with the terms of use and the profileID analyzed by the license-issuing request processing function part 40. A license-issuing function part 43 creates a license having a predetermined format using the data converted by the license-issuing request conversion function part 42, and supplies the license to the shop 30 (see FIG. 3).

For example, if the information receiving apparatus 20 is a general PC and if a user of the information receiving apparatus 20 purchases content represented by a contentID of 1 through a service represented by a profileID of 1, information representing "1" as the profileID and "PC" as the clientType is supplied to the license-issuing section 32. Also, as the terms of use for using the content, for example, the following information is supplied:

contentID=1
the number of playable times=100
time limit of playback=Jan. 1, 2004 at 00:00:00
the number of copyable times=3.

In this case, for example, a license shown in Table 1 is issued. Here, "usageRulesID" in Table 1 represents an ID of the license. Also, "timeStamp" and "validity" in Table 1 represent the issuing time of the license and the term of validity of the license, respectively.

TABLE 1

```
UsageRight {
    rightData {
        version=1.0
        ProfileID=1
        usageRulesID=1
        timeStamp=2003/1/1 00:00:00
        validity=2010/1/1 00:00:00
        usageCondition {
            contentID=1
        }
        usageRules {
            playbackCount=100
            playbackLimit=2004/1/1 00:00:00
            copyCount =3
        }
        invariables {
        }
    }
}
``` performance compared with PCs and if a user of the information receiving apparatus 20 purchases content represented by a contentID of 1 through a service represented by a profileID of 1, information representing "1" as the profileID and "PDA" as the clientType is supplied to the license-issuing section 32. Also, as the terms of use for using the content, for example, the following information is supplied:

contentID=1
the number of playable times=100
time limit of playback=Jan. 1, 2004 at 00:00:00
the number of copyable times=3.

In this case, for example, a license shown in Table 2 is issued.

TABLE 2

```
UsageRight {
    rightData {
        version=1.0
        ProfileID=1
        usageRulesID=1
        timeStamp=2003/1/1 00:00:00
        validity=2010/1/1 00:00:00
        usageCondition {
            1
        }
        usageRules {
            100
            2004/1/1 00:00:00
            3
        }
        invariables {
        }
    }
}
``` the license are simplified, and the details corresponding to the performance of the PDA are provided. In this case, since the order of data is important in "usageRules", the order cannot be changed.

As described above, in this embodiment, the information receiving apparatus 20 transmits a license-issuing request including a clientType representing the type of the information receiving apparatus 20 in order to request for issuing of a license corresponding to content, and the information transmitting apparatus 10 reads the terms of use for using the content from the database 31 (see FIG. 3) and transmits the license including the terms of use and having the details corresponding to the performance of the information receiving apparatus 20 to the information receiving apparatus 20. Thus, the information transmitting apparatus 10 is capable of transmitting a license corresponding to the performance of each type of information receiving apparatus.

In particular, since the license-issuing section 32 (see FIG. 3) includes the license-issuing request conversion function parts $42_1$, $42_2$, . . . , and $42_n$ corresponding to combinations of profileIDs and clientTypes, even if a new information receiving apparatus is developed, the new information receiving apparatus can become readily compatible only by adding a license-issuing request conversion function part 42 (see FIG. 5) capable of converting data into data corresponding to the performance of the new information receiving apparatus. Also, since the license-issuing request conversion function parts $42_1$, $42_2$, . . . , and $42_n$ are commonly used for all the services, installing only an individual part enables compatibility with a new service.

Also, the present invention is not limited to the embodiment described above. It is obvious that various changes may be made to the present invention without departing from the spirit and the scope thereof.

For example, although, in the embodiment described above, the information receiving apparatus 20 transmits a content-purchasing request including information about the clientType of the information receiving apparatus 20 to the information transmitting apparatus 10 since the information transmitting apparatus 10 transmits content and a license, the present invention is not limited to this. For example, if the information transmitting apparatus 10 transmits only a license, the information receiving apparatus 20 may transmit a license-issuing request including information about the clientType.

Accordingly, license data having the details corresponding to the performance of each type of information receiving apparatus can be issued and transmitted.

What is claimed is:

1. An information transmitting apparatus for receiving a license-issuing request signal for requesting for issuing of license data corresponding to content data from an information receiving apparatus connected via a network and for transmitting the license data corresponding to the license-issuing request signal to the information receiving apparatus, the information transmitting apparatus comprising:
    storage means for storing the terms of use for using the content data; and
    license-issuing means for reading the terms of use from the storage means and for issuing the license data including the terms of use, wherein
    the license-issuing means issues the license data corresponding to performance of the information receiving apparatus in accordance with receiving apparatus identification information included in the license-issuing request signal and representing the type of the information receiving apparatus, wherein the license data is written at a length corresponding to the receiving apparatus identification information.

2. An information transmitting apparatus for receiving a license-issuing request signal for requesting for issuing of license data corresponding to content data from an information receiving apparatus connected via a network and for transmitting the license data corresponding to the license-issuing request signal to the information receiving apparatus, the information transmitting apparatus comprising:
    storage means for storing the terms of use for using the content data; and
    license-issuing means for reading the terms of use from the storage means and for issuing the license data including the terms of use, wherein
    the license-issuing means issues the license data corresponding to performance of the information receiving apparatus in accordance with receiving apparatus identification information included in the license-issuing request signal and representing the type of the information receiving apparatus, wherein the license-issuing means includes:
    a plurality of conversion function parts each provided in accordance with the type of the information receiving apparatus for performing predetermined conversion processing; and
    a sorting function part for sorting the terms of use into a corresponding conversion function part from among the plurality of conversion function parts in accordance with the receiving apparatus identification information, wherein
    the conversion function part into which the terms of use are sorted performs predetermined conversion processing on the terms of use.

3. An information transmitting method for receiving a license-issuing request signal for requesting for issuing of license data corresponding to content data from an information receiving apparatus connected via a network and for transmitting the license data corresponding to the license-issuing request signal to the information receiving apparatus, the information transmitting method comprising:
    reading the terms of use for using the content data from a memory;
    issuing the license data including the terms of use, the license data corresponding to performance of the information receiving apparatus is issued in accordance with receiving apparatus identification information included in the license-issuing request signal and representing the type of the information receiving apparatus; and
    writing the license data at a length corresponding to the receiving apparatus identification information.

4. An information transmitting method for receiving a license-issuing request signal for requesting issuance license data corresponding to content data from an information receiving apparatus connected via a network and for transmitting the license data corresponding to the license-issuing request signal to the information receiving apparatus, the information transmitting method comprising:
    reading the terms of use for using the content data from a memory;
    issuing the license data including the terms of use, the license data corresponding to performance of the information receiving apparatus is issued in accordance with receiving apparatus identification information included in the license-issuing request signal and representing the type of the information receiving apparatus;
    providing a plurality of conversion function units each provided in accordance with the type of the information receiving apparatus for performing a predetermined conversion processing;
    sorting the terms of use a corresponding conversion function unit from among the plurality of conversion function units in accordance with the receiving apparatus identification information, the conversion function unit into which the terms of used are sorted performing a predetermined conversion processing only terms of use.

5. An information providing system, comprising:
    an information receiving apparatus operably linked to a telecommunication network for transmitting a license-issuing request signal for requesting issuance of license data corresponding to content data;
    an information transmitting apparatus is operably linked to the telecommunication network for receiving the license-issuing request signal and including,
    storage means for storing the terms of use for using the content data; and
    license-issuing means for reading the terms of use from the storage means and for issuing the license data including the terms of use, wherein
    the license-issuing means issues the license data corresponding to performance of the information receiving apparatus in accordance with receiving apparatus identification information included in the license-issuing request signal and representing the type of the information receiving apparatus, wherein the license data is written at a length corresponding to the receiving apparatus identification information.

6. An information providing system, comprising:
    an information receiving apparatus operably linked to a telecommunication network for transmitting license issuing requests signal requesting issuance of license data corresponding to content data;
    an information transmitting apparatus operably linked to the telecommunication network for receiving the license-issuing request signal and includes,
    storage means for storing the terms of use for using the content data; and
    license-issuing means for reading the terms of use from the storage means and for issuing the license data including the terms of use, wherein the license-issuing means issues the license data corresponding to performance of the information receiving apparatus in accordance with receiving apparatus identification information included in the license-issuing request signal and representing the type of the information receiving apparatus, wherein the license-issuing means includes:
a plurality of conversion function parts each provided in accordance with the type of the information receiving apparatus for performing predetermined conversion processing; and
a sorting function part for sorting the terms of use into a corresponding conversion function part from among the plurality of conversion function parts in accordance with the receiving apparatus identification information, wherein
the conversion function part into which the terms of use are sorted performs predetermined conversion processing on the terms of use.

7. An information transmitting apparatus for receiving a license-issuing request signal for requesting for issuing of license data corresponding to content data from an information receiving apparatus connected via a network and for transmitting the license data corresponding to the license-issuing request signal to the information receiving apparatus, the information transmitting apparatus comprising:
a memory configured to store the terms of use for using the content data; and
a license-issuing unit configured to read the terms of use from the memory and for issuing the license data including the terms of use, the license-issuing unit issues the license data corresponding to performance of the information receiving apparatus in accordance with receiving apparatus identification information included in the license-issuing request signal and representing the type of the information receiving apparatus, wherein the license data is written at a length corresponding to the receiving apparatus identification information.

* * * * *

UNITED STATES PATENT AND TRADEMARK OFFICE
CERTIFICATE OF CORRECTION

| | | |
|---|---|---|
| PATENT NO. | : 7,243,836 B2 | Page 1 of 1 |
| APPLICATION NO. | : 10/866245 | |
| DATED | : July 17, 2007 | |
| INVENTOR(S) | : Seiichi Adachi | |

It is certified that error appears in the above-identified patent and that said Letters Patent is hereby corrected as shown below:

Column 5, line 55, before "performance", add --In contrast, if the information receiving apparatus 20 is a personal digital assistant (PDA) having a lower--

Column 6, line 22, before "the license", add --As shown in fig. 2, if the information receiving apparatus is a PDA, "usage condition" and "usage rules" of--

Signed and Sealed this

Eighteenth Day of December, 2007

JON W. DUDAS
*Director of the United States Patent and Trademark Office*